(12) United States Patent
Oran et al.

(10) Patent No.: US 7,729,267 B2
(45) Date of Patent: Jun. 1, 2010

(54) METHOD AND APPARATUS FOR ANALYZING A MEDIA PATH IN A PACKET SWITCHED NETWORK

(75) Inventors: David R. Oran, Acton, MA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1496 days.

(21) Appl. No.: 10/723,118

(22) Filed: Nov. 26, 2003

(65) Prior Publication Data

US 2006/0034188 A1    Feb. 16, 2006

(51) Int. Cl.
*H04J 1/16* (2006.01)
(52) U.S. Cl. .................................... 370/252; 370/395.2
(58) Field of Classification Search ................. 370/241, 370/241.1, 248, 249, 251, 252, 253, 238; 709/230
See application file for complete search history.

(56) References Cited

U.S. PATENT DOCUMENTS

| | | | |
|---|---|---|---|
| 4,006,320 A | 2/1977 | Markl | |
| 4,486,877 A | 12/1984 | Turner | |
| 4,569,042 A | 2/1986 | Larson | |
| 4,630,268 A | 12/1986 | Rodenbaugh | |
| 4,907,277 A | 3/1990 | Callens et al. | |
| 5,010,544 A | 4/1991 | Chang et al. | |
| 5,014,265 A | 5/1991 | Hahne et al. | |
| 5,121,382 A | 6/1992 | Yang et al. | |
| 5,159,592 A | 10/1992 | Perkins | |
| 5,243,342 A | 9/1993 | Kattemalalavadi et al. | |
| 5,274,643 A | 12/1993 | Fisk | |
| 5,343,461 A | 8/1994 | Barton et al. | |
| 5,353,283 A | 10/1994 | Tsuchiya | |
| 5,371,852 A | 12/1994 | Attanasio et al. | |
| 5,394,402 A | 2/1995 | Ross | |
| 5,416,842 A | 5/1995 | Aziz | |
| 5,422,876 A | 6/1995 | Turudic | |
| 5,426,637 A | 6/1995 | Derby et al. | |
| 5,430,715 A | 7/1995 | Corbalis et al. | |
| 5,450,449 A | 9/1995 | Kroon | |
| 5,452,294 A | 9/1995 | Natarajan | |
| 5,473,599 A | 12/1995 | Li et al. | |
| 5,491,692 A | 2/1996 | Gunner et al. | |

(Continued)

OTHER PUBLICATIONS

H. Schulzrinne and GMD Fokus, "RTP Profile for Audio and Video Conferences with Minimal Control", Jan. 1996, pp. 1-17.

(Continued)

*Primary Examiner*—Ricky Ngo
*Assistant Examiner*—Kan Yuen
(74) *Attorney, Agent, or Firm*—Stolowitz Ford Cowger LLP (57) ABSTRACT

No-op media payload packets are used to analyze a media path in a packet switched network. In one embodiment, the no-op packets are Real Time Protocol (RTP) payload packets that contain no media content. A Real Time Control Protocol (RTCP) report is generated for the received RTP no-op packets. A marker bit is set in one of the no-op packets that triggers the no-op packet receiver to send back the RTCP report. The media steam is transmitted when the statistics in the RTCP report indicate a viable media path.

18 Claims, 7 Drawing Sheets

U.S. PATENT DOCUMENTS

| | | | |
|---|---|---|---|
| 5,500,851 A | 3/1996 | Kozaki et al. | |
| 5,500,860 A | 3/1996 | Perlman et al. | |
| 5,519,704 A | 5/1996 | Farinacci et al. | |
| 5,555,256 A | 9/1996 | Calamvokis | |
| 5,561,669 A | 10/1996 | Lenny et al. | |
| 5,563,875 A | 10/1996 | Hefel et al. | |
| 5,594,732 A | 1/1997 | Bell et al. | |
| 5,602,918 A | 2/1997 | Chen et al. | |
| 5,604,803 A | 2/1997 | Aziz | |
| 5,617,417 A | 4/1997 | Sathe et al. | |
| 5,617,421 A | 4/1997 | Chin et al. | |
| 5,621,721 A | 4/1997 | Vantuone | |
| 5,623,492 A | 4/1997 | Teraslinna | |
| 5,623,605 A | 4/1997 | Keshav et al. | |
| 5,642,515 A | 6/1997 | Jones et al. | |
| 5,650,993 A | 7/1997 | Lakshman et al. | |
| 5,651,002 A | 7/1997 | Van Seters et al. | |
| 5,659,542 A | 8/1997 | Bell et al. | |
| 5,673,265 A | 9/1997 | Gupta et al. | |
| 5,675,741 A | 10/1997 | Aggarwal et al. | |
| 5,689,566 A | 11/1997 | Nguyen | |
| 5,699,478 A | 12/1997 | Nahumi | |
| 5,699,485 A | 12/1997 | Shoham | |
| 5,715,399 A | 2/1998 | Bezos | |
| 5,740,171 A | 4/1998 | Mazzola et al. | |
| 5,740,176 A | 4/1998 | Gupta et al. | |
| 5,742,604 A | 4/1998 | Edsall et al. | |
| 5,764,636 A | 6/1998 | Edsall | |
| 5,793,763 A | 8/1998 | Mayes et al. | |
| 5,835,494 A | 11/1998 | Hughes et al. | |
| 5,838,994 A | 11/1998 | Valizadeh | |
| 5,850,388 A | 12/1998 | Anderson et al. | |
| 5,867,666 A | 2/1999 | Harvey | |
| 5,870,397 A | 2/1999 | Chauffour et al. | |
| 5,884,010 A | 3/1999 | Chen et al. | |
| 5,918,019 A | 6/1999 | Valencia | |
| 5,931,961 A | 8/1999 | Ranganathan et al. | |
| 5,943,347 A | 8/1999 | Shepard | |
| 6,023,455 A | 2/2000 | Takahashi | |
| 6,032,194 A | 2/2000 | Gai et al. | |
| 6,061,454 A | 5/2000 | Malik et al. | |
| 6,104,695 A | 8/2000 | Wesley et al. | |
| 6,118,796 A * | 9/2000 | Best et al. | 370/524 |
| 6,192,036 B1 | 2/2001 | Buhler et al. | |
| 6,230,271 B1 | 5/2001 | Wadlow et al. | |
| 6,275,471 B1 * | 8/2001 | Bushmitch et al. | 370/248 |
| 6,337,861 B1 | 1/2002 | Rosen | |
| 6,356,545 B1 | 3/2002 | Vargo et al. | |
| 6,389,006 B1 | 5/2002 | Bialik | |
| 6,445,717 B1 | 9/2002 | Gibson et al. | |
| 6,515,967 B1 | 2/2003 | Wei et al. | |
| 6,526,044 B1 | 2/2003 | Cookmeyer et al. | |
| 6,584,438 B1 | 6/2003 | Manjunath et al. | |
| 6,614,781 B1 | 9/2003 | Elliott et al. | |
| 6,665,637 B2 | 12/2003 | Bruhn | |
| 6,687,225 B1 | 2/2004 | Kawarai et al. | |
| 6,687,360 B2 | 2/2004 | Kung et al. | |
| 6,700,874 B1 * | 3/2004 | Takihiro et al. | 370/248 |
| 6,725,191 B2 | 4/2004 | Mecayten | |
| 6,731,609 B1 | 5/2004 | Hirni et al. | |
| 6,741,600 B1 * | 5/2004 | Weiss et al. | 370/404 |
| 6,757,654 B1 | 6/2004 | Westerlund et al. | |
| 6,775,703 B1 * | 8/2004 | Burns et al. | 709/228 |
| 6,785,261 B1 | 8/2004 | Schuster et al. | |
| 6,798,739 B1 | 9/2004 | Lee | |
| 6,804,244 B1 | 10/2004 | Anandakumar et al. | |
| 6,836,804 B1 | 12/2004 | Jagadeesan | |
| 6,839,353 B1 | 1/2005 | DeJager | |
| 6,944,132 B1 | 9/2005 | Aono et al. | |
| 6,947,381 B2 | 9/2005 | Wen et al. | |
| 7,013,267 B1 | 3/2006 | Huart et al. | |
| 7,039,716 B1 | 5/2006 | Jagadeesan | |
| 7,047,190 B1 | 5/2006 | Kapilow | |
| 7,068,607 B2 * | 6/2006 | Partain et al. | 370/241 |
| 7,072,968 B2 * | 7/2006 | Mikami et al. | 709/229 |
| 7,099,820 B1 | 8/2006 | Huart et al. | |
| 7,212,517 B2 | 5/2007 | Dzik | |
| 7,286,467 B1 * | 10/2007 | Sylvain | 370/216 |
| 7,310,334 B1 * | 12/2007 | FitzGerald et al. | 370/389 |
| 7,336,620 B2 | 2/2008 | Bennett | |
| 7,352,705 B1 | 4/2008 | Adhikari et al. | |
| 2002/0003775 A1 | 1/2002 | Nakano et al. | |
| 2002/0067693 A1 | 6/2002 | Kodialam et al. | |
| 2002/0083186 A1 | 6/2002 | Stringer | |
| 2003/0053419 A1 * | 3/2003 | Kanazawa et al. | 370/252 |
| 2003/0072269 A1 * | 4/2003 | Teruhi et al. | 370/252 |
| 2003/0097438 A1 | 5/2003 | Bearden et al. | |
| 2003/0110276 A1 | 6/2003 | Riddle | |
| 2003/0163772 A1 | 8/2003 | Jaworski | |
| 2003/0165114 A1 * | 9/2003 | Kusama et al. | 370/216 |
| 2003/0208616 A1 | 11/2003 | Laing et al. | |
| 2003/0219022 A1 | 11/2003 | Dillon et al. | |
| 2003/0220971 A1 * | 11/2003 | Kressin | 709/204 |
| 2004/0008715 A1 | 1/2004 | Barrack et al. | |
| 2004/0052257 A1 | 3/2004 | Abdo et al. | |
| 2004/0073690 A1 * | 4/2004 | Hepworth et al. | 709/230 |
| 2004/0125965 A1 | 7/2004 | Alberth et al. | |
| 2004/0170163 A1 | 9/2004 | Yik et al. | |
| 2004/0193709 A1 | 9/2004 | Selvaggi et al. | |
| 2004/0218617 A1 * | 11/2004 | Sagfors | 370/412 |
| 2004/0223458 A1 | 11/2004 | Gentle | |
| 2004/0240431 A1 | 12/2004 | Makowski et al. | |
| 2004/0252646 A1 * | 12/2004 | Adhikari et al. | 370/252 |
| 2005/0036519 A1 * | 2/2005 | Balakrishnan et al. | 370/503 |
| 2005/0117576 A1 * | 6/2005 | McDysan et al. | 370/389 |
| 2005/0226172 A1 | 10/2005 | Richardson | |
| 2005/0243733 A1 | 11/2005 | Crawford et al. | |
| 2005/0246041 A1 | 11/2005 | Kreifeldt et al. | |
| 2005/0283639 A1 | 12/2005 | Le Pennec et al. | |
| 2006/0041431 A1 | 2/2006 | Maes | |
| 2006/0098586 A1 | 5/2006 | Farrell et al. | |
| 2006/0112400 A1 | 5/2006 | Zhang et al. | |
| 2006/0122835 A1 | 6/2006 | Huart et al. | |
| 2006/0215684 A1 | 9/2006 | Capone | |
| 2006/0268742 A1 | 11/2006 | Chu et al. | |
| 2006/0274760 A1 | 12/2006 | Loher | |
| 2007/0064616 A1 | 3/2007 | Miranda et al. | |
| 2007/0107034 A1 | 5/2007 | Gotwals | |
| 2007/0153774 A1 | 7/2007 | Shay et al. | |
| 2007/0171835 A1 | 7/2007 | Gobara et al. | |
| 2007/0212065 A1 | 9/2007 | Shin et al. | |
| 2007/0286165 A1 * | 12/2007 | Chu et al. | 370/352 |

OTHER PUBLICATIONS

M. Handley and V. Jacobson, "SDP: Session Description Protocol", Apr. 1998, pp. 1-40.

H. Schulzrinne, GMD Fokus, S. Casner, R. Frederick, and V. Jacobson, "RTP: A Transport Protocol for Real-Time Applications", Jan. 1996, pp. 1-71.

Webpage http://www.cis.ohio-state.edu/~cliu/ipmultimedia/ entitled "Multimedia Over IP: RSVP, RTP, RTCP, RTSP", Jan. 8, 2002, pp. 1-27.

H. Schulzrinne et al., RTP: A Transport Protocol for Real-Time Applications, RFC3550, Network Working Group, Jul. 2003, 98 pages.

Townsley, et al.Layer Two Tunneling Protocol "L2TP", RFC 2661, Network Working Group, Aug. 1999, 75 pages.

File History for U.S. Appl. No. 10/797,689, filed Mar. 9, 2004; Issued Patent No. 7,496,044.

File History for U.S. Appl. No. 10/797,520, filed Mar. 9, 2004; Issued Patent No. 7,519,006.

Rosen et al., "MPLS Label Stock Encoding", RFC 3032, Jan. 2001.

S. Niccolini et al., draft-niccolini-ippm-storetraceroutes-02.txe, Oct. 24, 2005.

C. Jennings, draft-jennings-behave-test-results-02.txt, Jun. 25, 2006.

Andreasen, et al., RTP No-Op Payload Format, Internet-Draft, Feb. 2004, pp. 1-8, Internet Engineering Task Force.

Rosenberg, et al., STUN—Simple Traversal of User Datagram Protocol (UDP) Through Network Address Translators (NATs), RFC 3489, Mar. 2003, pp. 1-44, Network Working Group.

International Preliminary Report on Patentability and Written Opinion of ISA for PCT/US2004/039431; mailed Jun. 14, 2009; ISA/US.

International Search Report for PCT/US2004/039431; mailed Jun. 14, 2009; ISA/US.

International Preliminary Report on Patentability and Written Opinion of ISA for PCT/US2007/069567; mailed Aug. 12, 2008.

International Search Report for PCT/US2007/69567; mailed Aug. 12, 2008; ISA/US.

Liao et al., "Adaptive recovery techniques for real-time audio streams," IEEE INFOCOM 2001. Twentieth Annual Joint Conference of the IEE Computer and Communications Societies Proceedings Apr. 22-26, 2001, vol. 2, pp. 815-823.

R. Ullmann, "Rap: Internet Route Access Protocol," Internet Community's Request for Comments No. 1476, (Jun. 1993).

P Newman et al., "Ipsilon Flow Management Protocol Specification for Ipv4 Version 1.0," Internet Community's Request for Comments No. 1953, (May 1996).

M. Perez et al., "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

M. Laubach, "Classical IP and ARP over ATM," Internet Community's Request for Comments No. 1577, (Jan. 1994).

Kalyaranaman et al., "Performance and Buffering Requirements of Internet Protocols over ATM ABR and UBR Services," IEEE Communications magazine, vol. 36, No. 6, Jun. 1998.

Woundy et al., "ARIS: Aggregate Route-Based IP Switching," Internet Draft draft-woundy-aris-ipswitching-00.txt, Nov. 1996.

M. McGovern, et al., "CATNIP: Common Architecture For The Internet," Internet community's Request for Comments No. 1707, (Oct. 1994).

S. Deering, et al., "Internet Protocol, Version 6," Internet Community's Request for Comments No. 1883, (Dec. 1995).

Rosen et al., "A proposed Architecture for MPLS," IETF Network Working Group Internet Draft draft-ietf-mpls-arch-00.txt, Aug. 1997.

Callon et al., "A Framework for Multiprotocol Label Switching," IETF Network Working Group Internet Draft draft-ietf-mpls-framework-02.txt, Nov. 21, 1997.

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route-Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services," CCITT Recommendation Q.922, International Telecommunication Union, Geneva, 1992.

G. P. Chandranmenon and G. Varghese, "Trading Packet Headers for packet Processing," Proc. ACM SIGCOMM '95, Boston, MA, Sep. 1995, pp. 162-173.

Stolowitz Ford Cowger LLP, Listing of Related Cases, Oct. 6, 2009.

Prosecution History for U.S. Appl. No. 11/614,843, filed Dec. 21, 2006.

Prosecution History for U.S. Appl. No. 11/626,819, filed Jan. 24, 2007.

Information Sciences Institute, University of Southern California, "Internet Protocol Darpa Internet Program Protocol Specification", Sep. 1981, pp. 1-49.

Information Sciences Institute, University of Southern California, "Transmission Control Protocol Darpa Internet Program Protocol Specification", Sep. 1981, pp. 1-88.

Information Sciences Institute, University of Southern California, R. Braden, Internet Engineering Task Force, "Requirements for Internet Hosts—Communication Layers", Oct. 1989, pp. 1-115.

* cited by examiner

METHOD AND APPARATUS FOR ANALYZING A MEDIA PATH IN A PACKET SWITCHED NETWORK

BACKGROUND

The Real Time Transport Protocol (RTP) is the primary protocol used for real time media transport over Internet Protocol (IP) networks. The RTP protocol is used for carrying voice, video, real time text, and other media types. In order to assess the reception quality of an RTP media stream, an associated Real Time Control Protocol (RTCP) feedback channel is used by the receiver to send information back to the sender.

There are a number of cases where it is undesirable to play out media. For example, a session setup protocol may wish to assess media channel viability before committing to forming a full media session and before alerting a user of a media call. It also may be undesirable to play out media when doing synthetic load testing or when there is a need to fill a channel to a constant packet rate to emulate a constant-bit-rate encoder or to foil traffic analysis attacks.

In one example, a first party may make an IP phone call to a second party. A signaling protocol is used to establish the phone call. The call signaling path may be operating correctly, thus allowing a signaling stream between the two parties. However, the media path is different from the signaling path. This means the correct operation of the signaling exchanges does not imply the ability to successfully exchange media packets.

Other communication networks, such as a Public Switched Telephone Network (PSTN) have the ability through mechanisms like Continuity Test (COT) to delay media play out while determining the viability of the media channel. A similar capability is desirable for Internet Protocol (IP) networks. It would be desirable to implement this capability with minimal or no new protocol machinery, and within the confines of existing IP standards.

Ideas have been proposed even in the packet domain for sending certain test packets for verifying that a media stream can be adequately supported over the IP network. Previous ideas include sending ping-pong packets or sending Named Signaling Events (NSEs) as described in RFC2833. Other ideas have suggested sending early media, or using "probe" packets before establishing the call. However, these ideas require awkward associations of RTP streams and non-standard behavior of endpoints.

The test packets may use an independent test path which presents several problems. First the test path and the media path may take different routes over the IP network. Another problem is that the test packets in the test path may be processed in the receiving device in a different way than the media stream received in the media path.

SUMMARY OF THE INVENTION

No-op media payload packets are used to analyze a media path in a packet switched network. In one embodiment, the no-op packets are Real Time Protocol (RTP) payload packets that contain no media content. A Real Time Control Protocol (RTCP) report is generated for the received RTP no-op packets. A marker bit is set in one or more of the no-op packets that triggers the no-op packet receiver to send back the RTCP report. The adequate operation of the media path is determined by examining the statistics in the RTCP report.

DETAILED DESCRIPTION

A new media payload type is referred to as a no-op payload packet or simply a no-op packet. One application for the no-op packet is in the Real Time Transport Protocol (RTP), which is specified in RFC3550. The RTP protocol is used for carrying a real time media stream over an IP network. The media stream can contain any type of real time media, including not just audio or video, but also other media such as real time text transmission, or voice-band data such as fax or modem information. The no-op payload packets, when used in RTP, are referred to as RTP no-op packets. The no-op packet in one embodiment has no media payload and uses a one-bit opcode in the RTP payload for requesting a media path continuity report.

The no-op payload packets are literally a no-op coder. When negotiated through a Session Description Protocol (SDP—RFC2327), H.245, or some other media description protocol, any sender is able to send RTP packets with this coder. Any receiver who has expressed willingness to receive this coder processes the RTP no-op packets according to the basic RTP specification and then discards the RTP no-op packets without performing actual media play-out.

The RTP no-op packets allow the instrumentation mechanisms in RTP, namely the information in Real Time Control Protocol (RTCP) reports, to be evaluated prior to actually sending voice, audio, or other media in an RTP session. For example, an implementation may decide that the media stream is not sent for this session if the RTCP report indicates a low quality media path.

Figure 1:
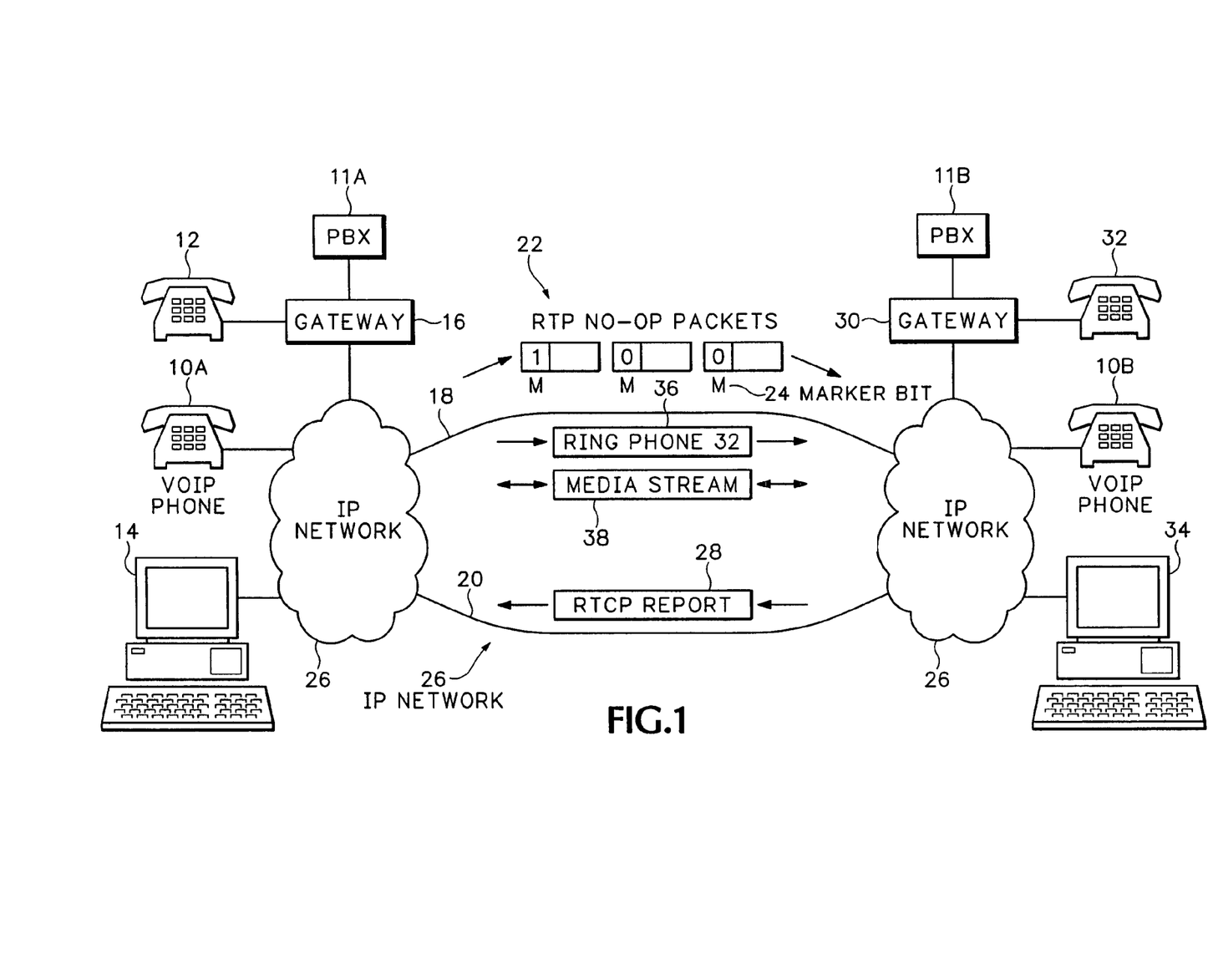
FIG. 1 is a block diagram showing how no-op payload packets are used for evaluating a media path.

FIG. 1 shows a Wide Area Network (WAN) or Local Area Network (LAN) referred to generally as IP network 26 that is used for transferring a real time media stream 38. Plain Old Telephone Service (POTS) phone 12, Private Branch Exchange (PBX) 11A, etc. are coupled to the IP network 26 through voice gateway 16. Another POTS phone 32, PBX 11B, etc. are coupled to the IP network 26 through voice gateway 30. Voice Over Internet Protocol (VoIP) phones 10A and 10B and computers 14 and 34 are coupled directly to the IP network 26.

Any of the voice gateways 16, 32, VoIP phones 10A, 10B, and computers 14 and 34 include any combination of hardware and software for receiving or sending a media stream 38. The media stream 38 can include any real time media such as audio data, video data, and real time text such as the text used for the hearing impaired.

Any combination of the phones 10A, 10B, 12, and 32; PBXs 11A and 11B; computers 14 and 34; and gateways 16 and 30 are referred to below generally as endpoints, users, senders or receivers, etc. One of the endpoints initiates a media call to another endpoint. If one of the phones 12 or 32 initiates the call, the gateway 16 or 30, respectively, would make the VoIP call on behalf of the phone. For example, the phone 12 may make a VoIP phone call to phone 32. A caller dials a phone number using phone 12 and the gateway 16 then determines the IP address for the gateway 30 serving phone 32. The two gateways 16 and 30 then conduct a signaling protocol for establishing the VoIP call between phone 12 and phone 32.

In another scenario, the computer 14 may want to receive a video stream or audio stream from computer 34 which operates as a music and video content server. In another scenario, the computer 14 may wish to make a VoIP call to VoIP phone 10B. The computer 14 initiates the media connection to VoIP phone 10B. The computer 14 may establish the media connection through a gateway or may access VoIP phone 10B through the IP network 26, without using a gateway. Media connections can also be initiated from any of the other devices 10A, 10B, 11A, 11B, 32, or 34.

In the example described below, the phone 12 initiates a VoIP phone call to phone 32. For clarity, operations will be described as being performed by the phones 12 and 32. However, some of these operations could be performed by the gateways 16 and 30. The phone number for phone 32 is entered at phone 12. There may be an intermediary device, such as a call controller that determines the IP address for gateway 30 or phone 32 based on the phone number dialed by phone 12. During this initial signaling, the two gateways 16 and 30 agree to use the no-op payload packet verification process described below.

Prior to transmitting the media stream 38, gateway 16 sends one or more no-op payload packets 22. In this example, the no-op payload packets are RTP no-op packets and three of the RTP no-op packets are sent from gateway 16 to gateway 30. However any type of no-op payload packets 22 can be sent depending on the media stream carrier protocol. Any number of the no-op payload packets can be sent by gateway 16. However, the number of no-op packets should be limited to prevent substantial delay in completion of the call setup.

The RTP no-op packets 22 have the same format as conventional RTP packets except that the packet payload contains no media. In the example shown, a marker bit 24 in the packet payload is not set in the first two RTP no-op packets 22 but the marker bit 24 is set in the third RTP no-op packet 22. It should be understood that this is only one example and any number of no-op packets 22 can be sent. For example, in other implementations less than three, or more than three, no-op packets are sent with the last no-op packet having a set marker bit 24. In another example, only one no-op packet is sent with that single no-op packet having a set marker bit.

When the gateway 30 receives the RTP No-Op packet with the marker bit set, the gateway 30 immediately generates an RTCP report 28 that includes Quality of Service (QoS) data for all of the RTP no-op packets 22 previously received. The RTCP report 28 is generated in the same manner used for generating RTCP reports for conventional RTP packets containing media payloads. For example, the phone 32 may count the number of received RTP no-op packets 22 as well as tracking latency and jitter statistics.

The RTCP report 28 would normally be sent by gateway 30 to gateway 16 about every 5 seconds. However, the set marker bit 24 in the RTP no-op packet 22 causes the gateway 30 to immediately send the RTCP report 28 to gateway 16. In this example, the RTCP report 28 would indicate that three RTP packets were received by gateway 30 if no packets were lost or unduly delayed. If the information in RTCP report 28 indicates the media path 18 carrying the RTP no-op packets 22 is operating adequately, signaling 36 is sent causing phone 32 to ring. This can be the unmodified "alert" signaling, or could be QoS-aware signaling using preconditions as described in RFC3312. Then the two phones 12 and 32 start sending the real time media stream 38.

If the RTCP report 28 indicates that the media path 18 is not operating adequately the signaling protocol is so informed, and can take action based on local or global policy. Possible policies include, but are not limited to: aborting the call such that the phone 32 does not ring, continuing with the call but making note to the accounting and billing system that the call may have to be discounted due to poor quality, or eliminating the problematical media stream if the call carries multiple media streams (e.g. audio and video).

In the case where the call is aborted, the aborted call may be established over an alternate path in IP network 26 or over an alternative medium, such as over a circuit switched network. A poorly performing media path may be identified when the RTCP report 28 indicates that fewer RTP no-op packets were received by gateway 30 than were sent by gateway 16. A media path problem may also be identified in the RTCP report 28 if the amount of latency or jitter in the RTP no-op packets 22 is outside of some expected range. In another scenario, a bad media path is indicated when the RTCP report 28 is not received by gateway 16 within some amount of time after gateway 16 sends out an RTP no-op packet 22 with the set marker bit 24.

The no-op packet call verification process described above can be performed independently for each endpoint. For example, in a bidirectional transmission, such as with a phone call between phones 12 and 32, each phone can make a determination whether or not to establish the call based on the information in the RTCP report 28 received from the other phone or gateway, or the lack of a RTCP report 28.

If the media transmission is unidirectional, then only one endpoint may need to verify the media channel. Unidirectional media transmissions are used for music or video streams transmitted unidirectionally from a media server to a user. In this application, only the path from the media server to the user is important for media quality considerations. Thus, only the user receiving the media stream needs to send RTP no-op packets and evaluate the RTCP report 28 sent by the media server.

Figure 2:
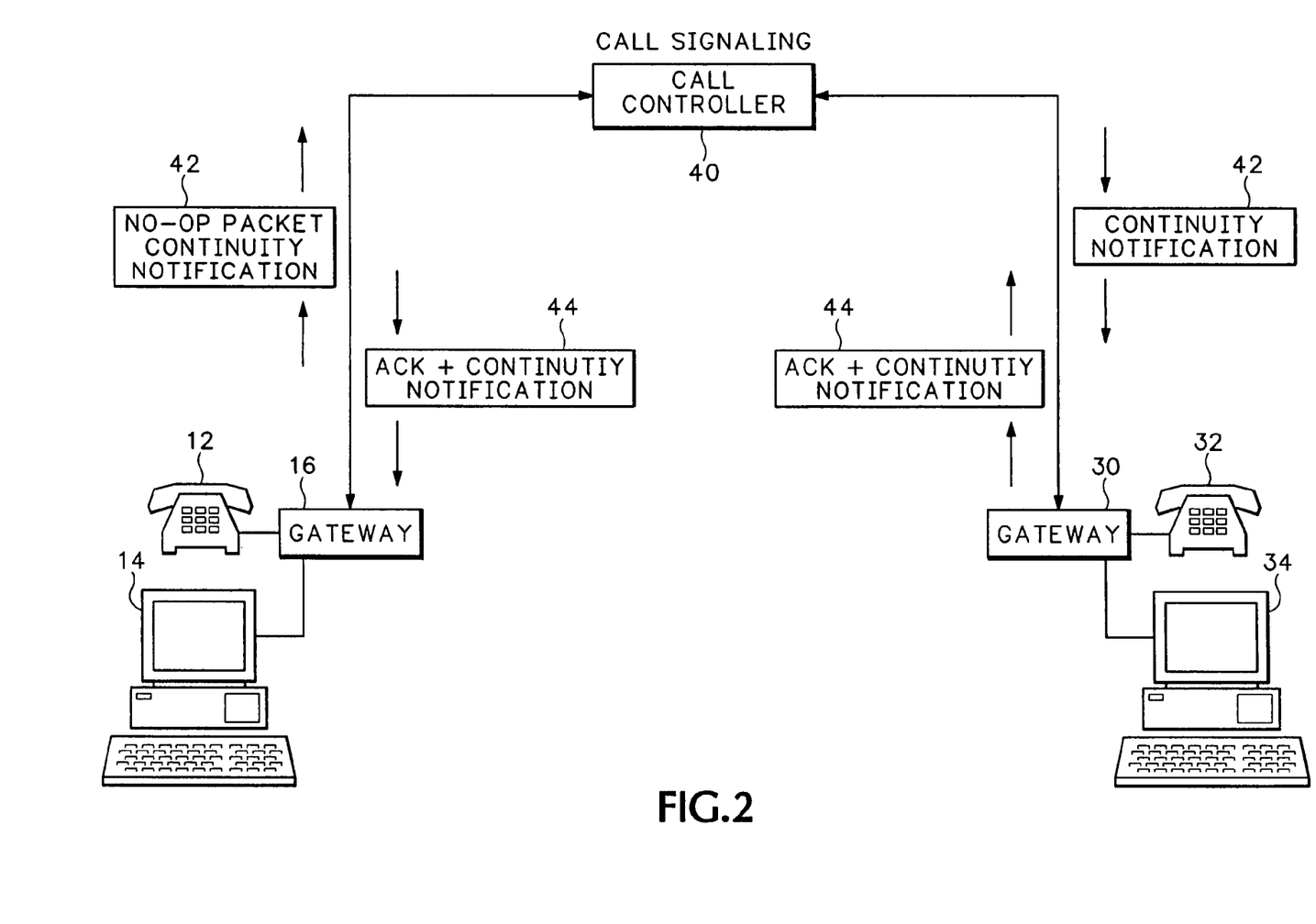
FIG. 2 is a block diagram showing how the no-op packet evaluation scheme is negotiated between two endpoints.

FIG. 2 shows generally how the initial call signaling is conducted between two endpoints. The Request For Comment (RFC) 3312 specifies one example of a real time media signaling protocol. Of course, other types of real time media stream signaling protocols can also be used. Examples of signaling protocols include Session Initiation Protocol (SIP), Session Definition Protocol (SDP) offer-answer, H323, and Media Gateway Control Protocol (MGCP).

Signaling messages 42 are sent from phone 12 to phone 32 prior to transmitting the media stream 38 shown in FIG. 1. The signaling messages 42 include a request or notification that the phone 12 intends to conduct a media path continuity check using RTP no-op packets. The signaling 42 may need to be conducted through a call controller 40. The phone 32 agrees to conduct a continuity check using the RTP no-op packets by sending acknowledgement signaling 44 back to phone 12.

The phone 32 can also send additional notification back to phone 12 in signaling 44 that indicates phone 32 also intends to send RTP no-op packet to phone 12 for continuity checking. The two phones 12 and 32 thus both agree to send and receive the RTP no-op packets 22 (FIG. 1) prior to sending and receiving a media stream.

RTP No-Op Packet Sender

Figure 3:
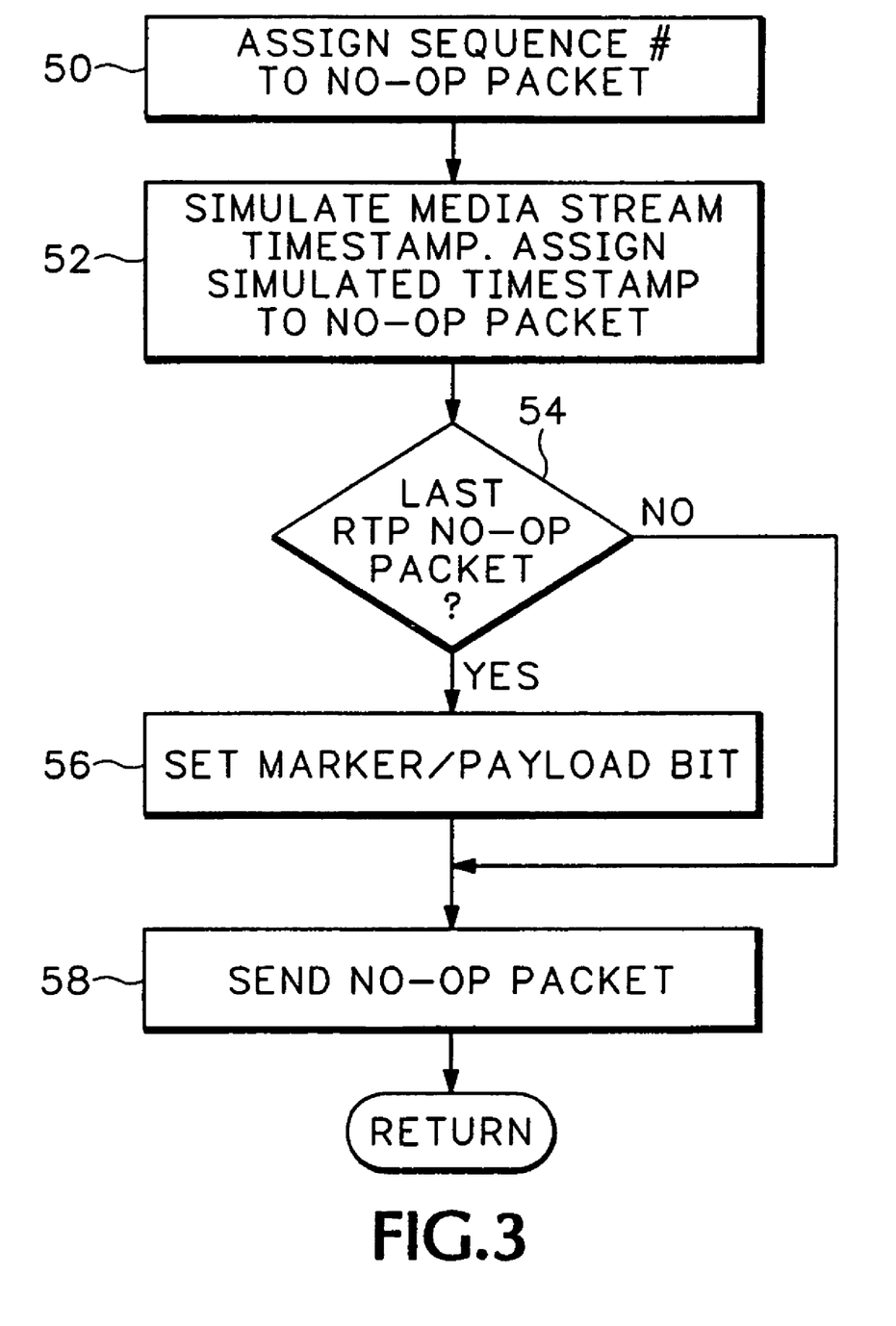
FIG. 3 is a flow diagram showing how the no-op payload packets are generated.

FIG. 3 shows in further detail the sequence followed by the RTP no-op packet sender. In block 50, sequence numbers are assigned to the RTP no-op packets starting at the next sequence number for the RTP session. The sequence number for each no-op packet is incremented by one in accordance with the RTP specification. In block 52, a timestamp is inserted into the no-op packet according to a packet time (ptime) parameter, also in accordance with RTP operation. The ptime parameter is conveyed via the signaling protocol, for example via SDP. It denotes a packetization interval identifying how many milliseconds of media are encoded into a single RTP packet.

The sender identifies in block 54 the last RTP no-op packet to be sent. If it is not the last no-op payload packet to be sent, then the sender transmits the no-op packet in block 58. If it is the last no-op packet, then the sender sets the marker bit in the RTP header of the no-op payload packet in block 56 causing the no-op packet receiver to immediately send back an RTCP report. The RTP no-op packet with the set marker bit is then transmitted to the receiver in block 58.

The RTCP report is sent within the session RTCP bandwidth limits and other RTCP sending rules. The scheme for sending the RTP no-op packets from the opposite end of the call are the same.

RTP No-Op Packet Receiver

Figure 4:
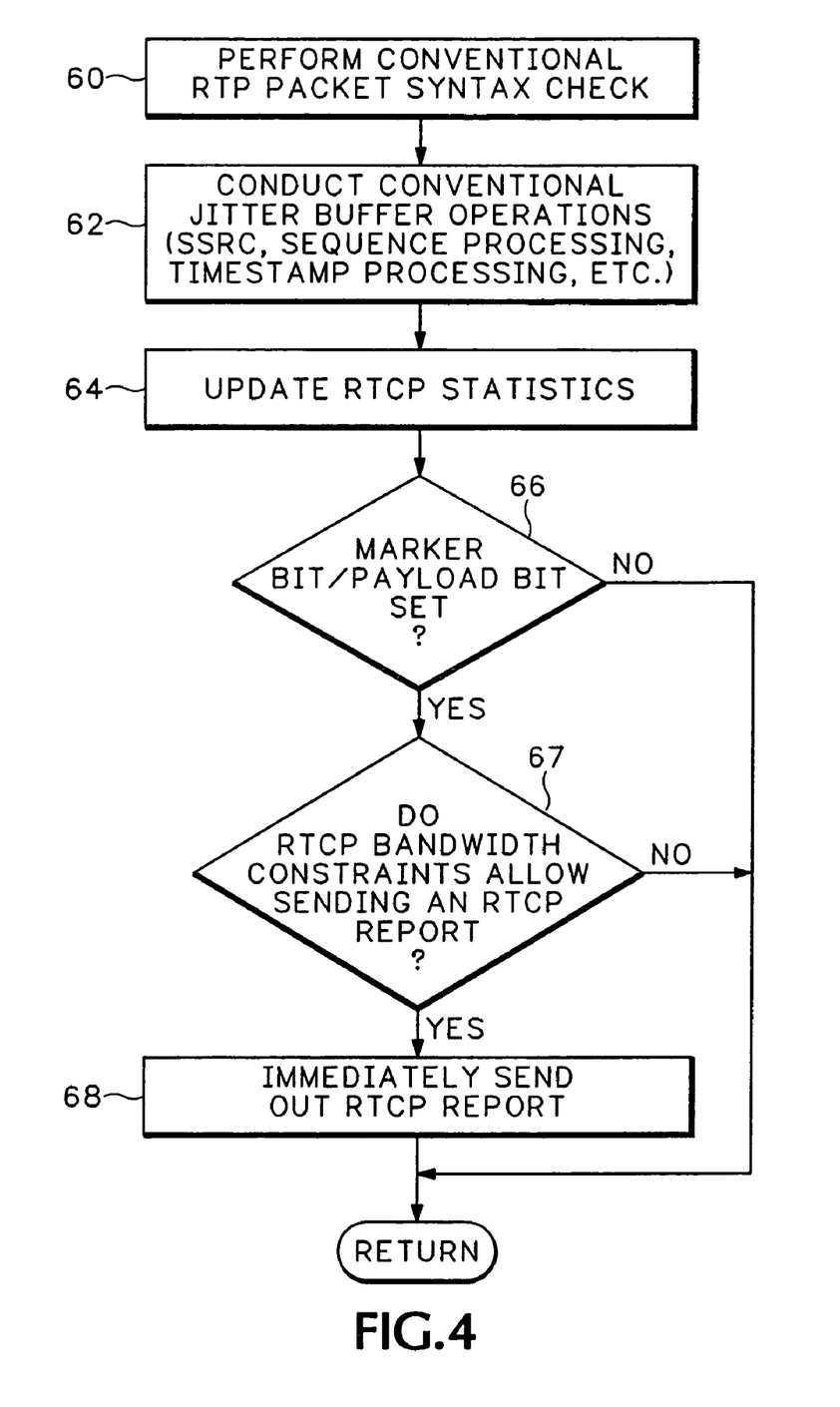
FIG. 4 is a flow diagram showing how the media path is analyzed using the no-op media packets.

FIG. 4 shows in further detail the operations used at the processing device receiving the RTP no-op packets. In block 60, a syntax check is performed on the received RTP no-op packets in the same way as any other RTP payload. In block 62, jitter buffer operations are performed on the RTP no-op packets in the same manner as any other RTP payload. The jitter buffer operations may include Synchronization Source field (SSRC), sequence, and timestamp processing.

In block 64, the RTCP statistics are updated for the RTP no-op packets in the same manner as for any other RTP payload format. If the marker bit in the RTP no-op packet is not set in block 66 or other RTCP sending rules are not met in block 67, the receiver continues to update RTCP statistics for any additionally received RTP no-op packets. If the marker bit is set for a received RTP no-op packet in block 66, other RTCP sending rules are checked in block 67. For example, it is determined if the RTCP bandwidth constraints allow sending the RTCP report. If these RTCP sending rules are met in block 67, the RTCP report is immediately sent to the no-op packet sender in block 68. The receiver rules for the other endpoint are the same, Media Channel Acceptance FIG. 5 describes the offer-answer exchange between the two endpoints. In block 70, one of the endpoints proposes using the "no-op" coder and payload format during the session. In one example, an SDP (or H.245) with an offer-answer style exchange is used for conducting the RTP no-op notification.

Figure 5:
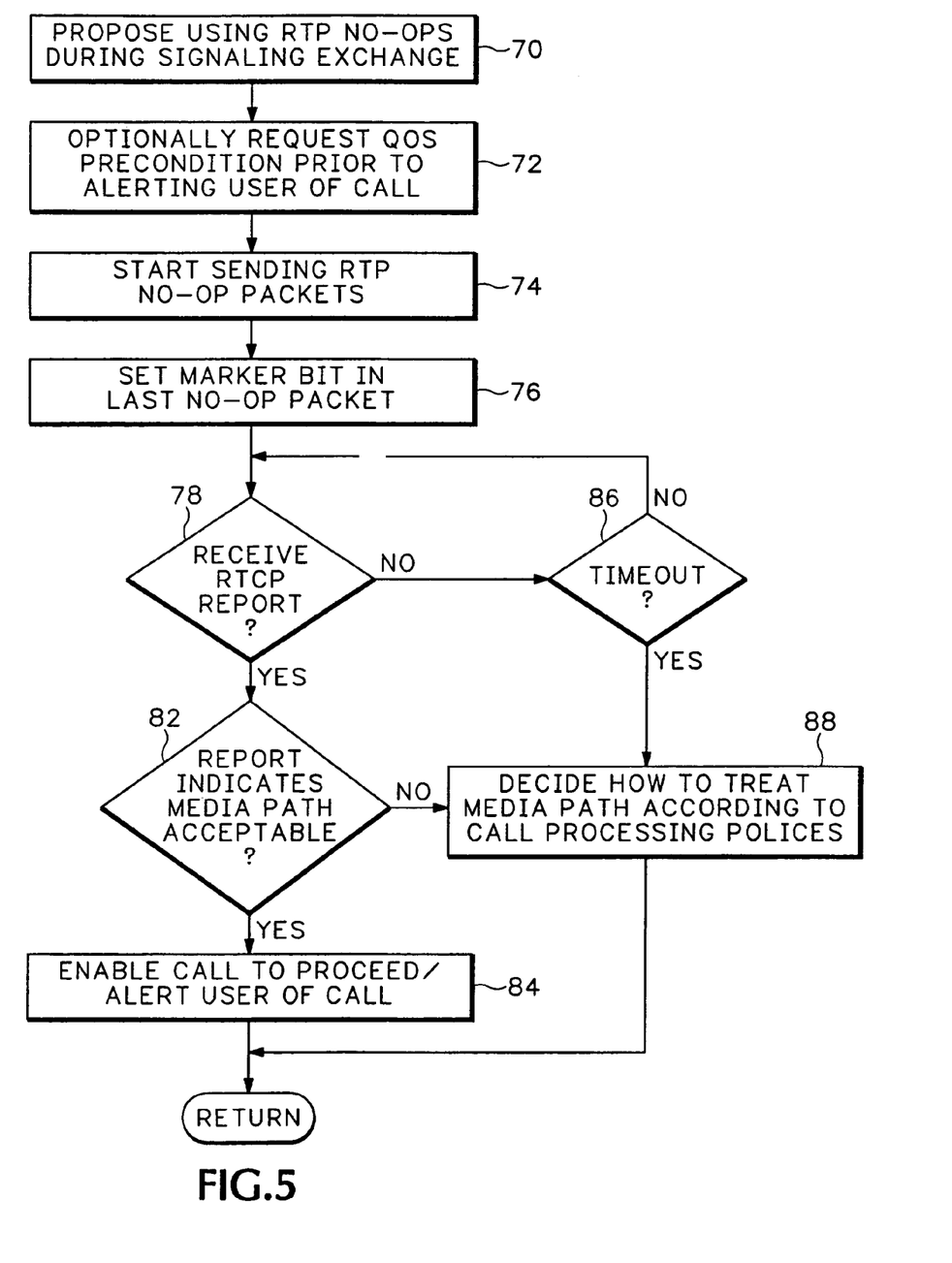
FIG. 5 is a flow diagram showing how the analysis information about the media path is used for establishing the media path.

In block 72, the notification may also optionally carry an RFC3312 precondition to ensure that no user is alerted of a call before the acceptance procedure using the no-op payload packets is successfully completed. The preconditions could be used in either direction, although it may be typical to enforce their use in both directions. For example, when there is an RTP session in both directions of a full-duplex VOIP call, both directions would be required to pass the no-op packet acceptance test.

After completing the first RFC3312 offer-answer exchange, the sender starts sending a configurable number of RTP no-op payload packets to the receiver in block 74. The marker bit is set in the last no-op payload packet in block 76. The receiver conducts the RTCP processing and returns the RTCP report after seeing the set marker bit. If the packet with the marker bit was lost, the RTCP report may be sent after the normal startup RTCP delay interval.

The sender waits for the RTCP report in block 78. If the RTCP report is not received in block 86 within some time period after sending out the last RTP no-op packet (i.e., timeout), the media path is declared unacceptable and the signaling protocol can decide what to do in block 88 according to any range of policies such as the ones described above. Alternatively, the procedure described above is repeated to cover the case of a single RTCP report packet getting lost.

If the RTCP report is received in block 78 within an acceptable time period, the RTCP report is examined in block 82. Depending on the loss and jitter statistics, the receiver either declares the channel acceptable or unacceptable in block 82. If the media channel is deemed unacceptable, the signaling protocol can decide what to do in block 88 according to the predetermined range of policies. If the channel is deemed acceptable, the precondition is marked as satisfied and the sender initiates (or responds to) the second phase of call establishment in block 84 that allows the call to proceed. In particular, one of the endpoints may notify a user of the call by activating an annunciation device.

Figure 6:
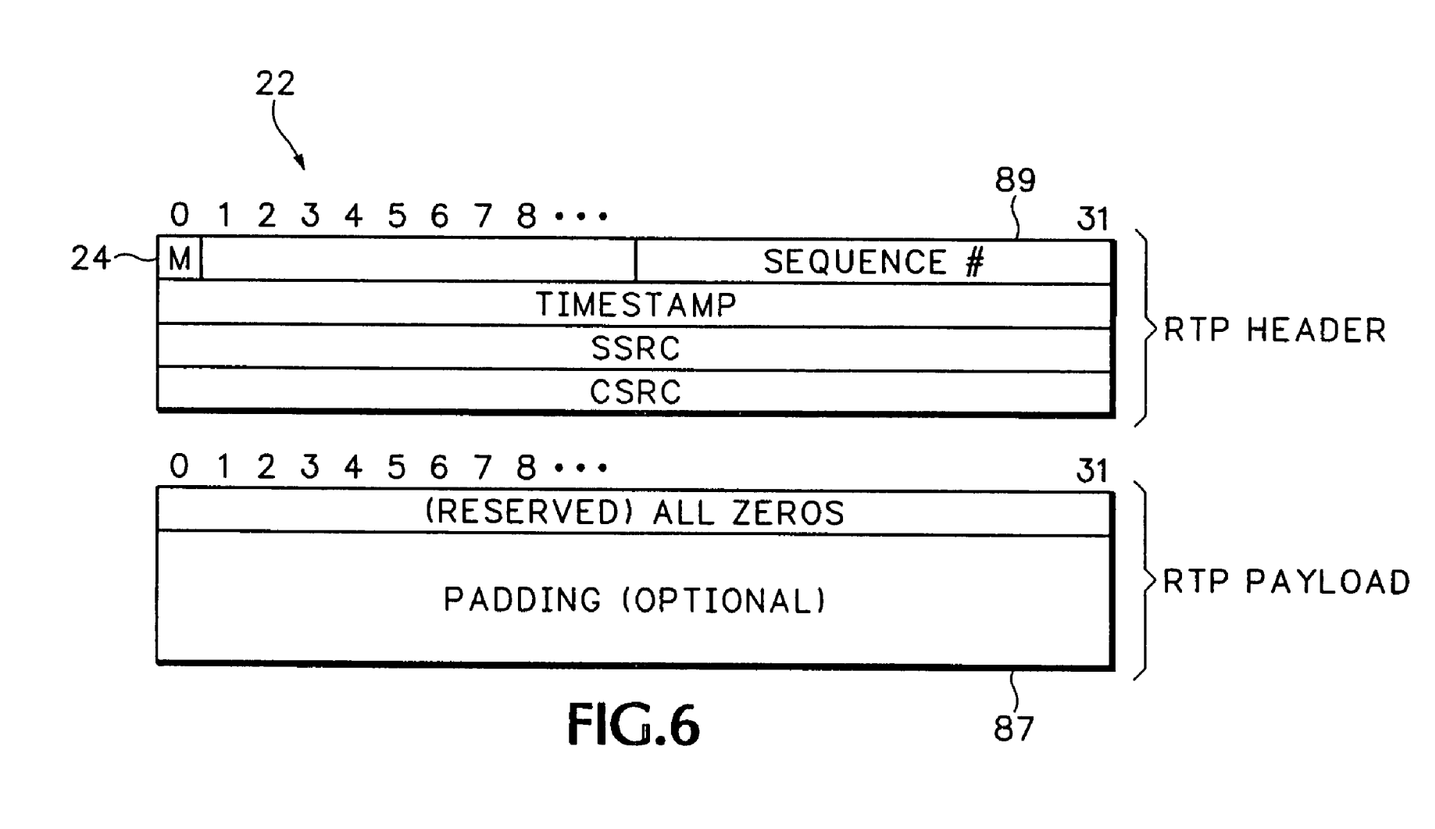
FIG. 6 is a diagram of an RTP no-op packet.

Referring to FIG. 6, the RTP no-op packet 22 is formatted to look like a normal RTP payload packet. This allows the no-op packet to operate and be processed in the same way as a voice, video or other type of RTP media packets. The RTP no-op packet will also take the same path as the RTP packets that are sent after the call is set up. The only difference is that the RTP no-op packets 22, 23, 24 are not played out by the receiver.

The packet header 89 includes conventional RTP header content including a sequence number, timestamp value, synchronization source identifiers and contributing source (CSRC) identifiers. The timestamp value can be the real timestamp used with actual media payloads or the timestamp value can be simulated.

The RTP no-op payload 87 employs the marker bit 24 in the RTP header. If bit 0 is set, the receiver immediately sends out an RTCP report. Bits 1-31 in the payload 87 are reserved and in one example must all be set to zero. Additional padding bytes may be appended up to the negotiated packet time (ptime) value in SDP. Padding may be useful to generate RTP packets that are the same size as other payload, such as a normal voice payload. Of course other formats can also be used in the RTP packet 22 for generating the no-op payload format.

Figure 7:
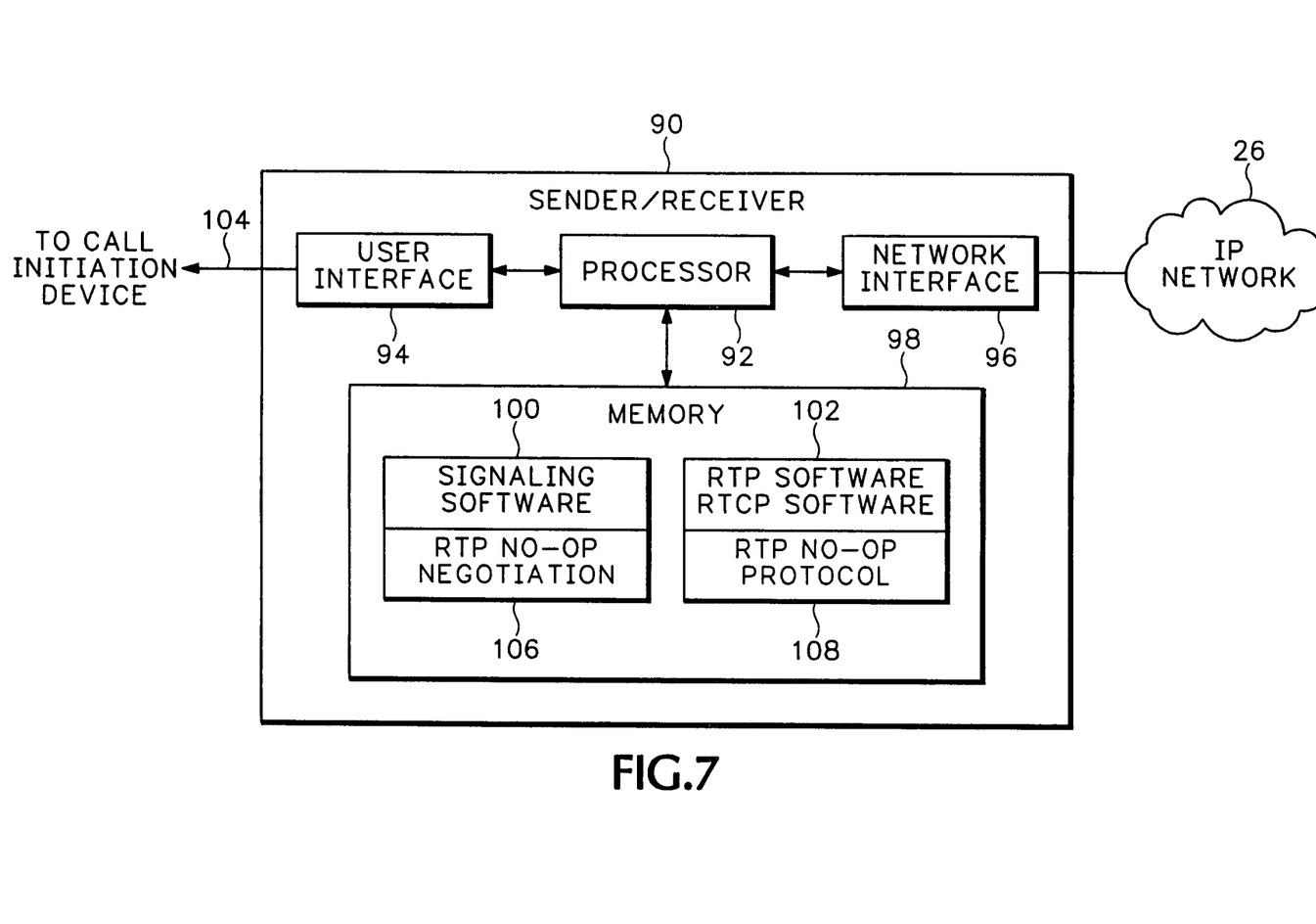
FIG. 7 is a detailed diagram of a network device that processes the no-op packets.

FIG. 7 shows in further detail the elements in a network device 90 that sends or receives the RTP no-op packets. The device 90 can provide the functionality in any combination of phones 12 and 32, computers 14 and 34, and gateways 16 or 30 shown in FIG. 1. For example, in one configuration the device 90 is either computer 14 or 34. The computer 14 or 34 performs all of the operations used for conducting the media session, including dialing another telephone or accessing another computer. In another configuration, the device 90 may be the gateway 16 or 30 shown in FIG. 1 and the media session is initiated by a VoIP phone or computer that is connected to the gateway.

A processor 92 is coupled to a user interface 94 and a network interface 96. The network interface 96 connects to the IP network 26. The user interface 94 connects to any device needed to initiate the media connection. For example, user interface 94 could connect to a keyboard or to a phone.

A memory 98 contains executable software that contains both call signaling software 100 and RTP and RTCP software 102. The memory 98 represents any combination of internal memory within the processor 92 or memory external to the processor 92. For example, the memory 98 can be any combination of flash, Read Only Memory (ROM), Random Access Memory (RAM), or disk memory used for containing and executing the signaling software 100 and the RTP and RTCP software 102.

The signaling software 100 is used for establishing the initial media path between the two endpoints. The signaling software 100 includes the RTP no-op negotiation described above. The RTP and RTCP software 102 conducts conventional RTP and RTCP with the addition of conducting media path verification using the RTP no-op packets and responding with RTCP reports as described above.

Thus, the RTP no-op payload format, with the special use of the RTP marker bit and RFC3312-style offer-answer and call signaling preconditions are used to perform channel acceptance testing as part of VoIP call establishment. Standard RTP packets are used rather than something special like a ping or an NSE. The marker bit is used along with RTCP to control the feedback loop.

This no-op payload scheme solves the problem of assessing media connectivity and channel quality in packet switched networks. The no-op scheme can be used in any and all VOIP or media endpoints, but particularly those for sale to and through service providers accustomed to channel assessment capabilities, such as those provided in circuit switched networks. The no-op payload format can also be used for other applications, such as synthetic load testing and to foil traffic analysis.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method for analyzing a media path in a packet switched network, comprising:
    conducting an initial media call signaling session with logic circuitry for establishing a media call and setting up the media path over the packet switched network, the media path established by successful completion of the initial media call signaling setup session and used for receiving or transmitting media packets containing media payloads;
    sending and/or receiving one or more no-op media payload packets over the media path with the logic circuitry during and within the initial media call signaling session prior to establishing the media call and setting up the media path, the no-op media payload packets formatted as though the media packets contain media payloads but the no-op media payload packets formatted without media payloads and not containing media payloads;
    requesting or receiving media path quality information with the logic circuitry associated with the no-op media payload packets during the initial media call signaling session prior to establishment of the media call being established by the initial media call signaling session;
    selectively completing or terminating the initial media call signaling session with the logic circuitry according to the information obtained from the transmission of the no-op media payload packet during the initial media call signaling session, successful completion of the initial media call signaling session enabling subsequent transmission or playing out of media packets containing media payloads over the media path; and
    inserting a time stamp into the transmitted no-op media payload packets with the logic circuitry that identifies a non-zero amount of simulated media time for media content in the no-op media payload packets that is not actually encoded into the no-op media payload packets.

2. A method according to claim 1 including formatting the no-op media payload packets as a Real Time Protocol (RTP) media payload packet that is formatted as though it contains media content but that contains no media content and sending the no-op media payload packets during a Session Initiation Protocol (SIP) media call signaling session.

3. A method according to claim 1 generating a media path analysis report from the information generated from the transmitted no-op media payload packets.

4. A method according to claim 3 wherein the media path analysis report is a Real Time Control Protocol (RTCP) report.

5. A method according to claim 3 including setting a marker bit in the no-op media payload packets to initiate a receiver to immediately send back the media path analysis report.

6. A method according to claim 5 including determining whether or not to transmit a media stream over the media path according to when or if the media path analysis report is received after transmitting the no-op media payload packets with the set marker bit.

7. A method according to claim 3 including generating the media path analysis report without playing out contents of the no-op media payload packets.

8. A method according to claim 3 including:
    receiving multiple no-op media payload packets during the same media call signaling session; and
    generating the media path analysis report according to transmission information for all of the multiple no-op media payload packets.

9. A method according to claim 1 including notifying a user of a media call according to the information associated with the transmission of the no-op media payload packets.

10. A network processing device, comprising:
    a processor configured to:
    conduct an initial media call signaling session for establishing a media call and setting up a media path over a packet switched network;
    send and/or receive one or more no-op media payload packets over the media path during the initial media call signaling session, the no-op media payload packets formatted as though the media packets contain media payloads but the no-op media payload packets formatted without media payloads;

selectively complete or terminate the initial media call signaling session according to information obtained from transmission of the no-op media payload packet during the initial media call signaling session, wherein successful completion of the initial media call signaling session enables subsequent transmission or playing out of media packets containing media payloads over the media path; and insert a time stamp into the no-op media payload packets that identifies a non-zero amount of simulated media time for media content in the media payload that is not actually encoded into the media payload of the packets.

11. The network processing device according to claim 10 wherein the processor is configured to generate a Real Time Control Protocol (RTCP) report using the information obtained from transmission of the no-op media payload packets.

12. The network processing device according to claim 10 including a user interface configured to communicate with a device that initiates an Internet Protocol network connection for transmitting the media packets.

13. The network processing device according to claim 10 wherein the initial media call signaling session notifies a receiver that the no-op media payload packets are going to be used for analyzing the packet switched network.

14. The network processing device according to claim 13 wherein the processor is configured to generate a marker bit in one of the no-op media payload packets that causes the receiver to send back the information obtained from transmission of the no-op media payload packets.

15. The network processing device according to claim 10 wherein the processor is configured to send or receive the media packets according to a number of successfully transmitted no-op media payload packets and the jitter statistics for the no-op media payload packets.

16. A method for analyzing a media path in a packet switched network, comprising:

initiating a Real Time Protocol (RTP) signaling session with a network processing device for establishing a media path for transporting RTP payload packets that contain media payloads;

sending multiple RTP payload packets with the network processing device during and within the RTP signaling session that are formatted as if the RTP payload packets contain a media payload but the RTP payload packets are formatted without media payloads and do not contain any media payload;

selectively completing or terminating the RTP signaling session with the network processing device according to information obtained by sending the RTP payload packets during the RTP signaling session, wherein successful completion of the RTP signaling session enables subsequent transmission or playing out of RTP packets containing media payloads over the media path; and inserting a time stamp into the transmitted RTP payload packets with the network processing device that identifies a non-zero amount of simulated media time for media content in the RTP payload packets that is not actually encoded into the RTP payload packets.

17. The method according to claim 16 including:

receiving multiple RTP payload packets that contain no media payload;

generating a Real Time Control Protocol (RTCP) report that includes media path information for the received RTP payload packets;

sending the RTCP report when one of the RTP payload packets is received that has a set marker bit; and establishing a media stream according to the media path information in the RTCP report.

18. The method according to claim 17 including delaying ringing a phone used for receiving a media stream until the RTCP report is received and indicates an acceptable media path for sending the media stream.

* * * * *